US007297893B2

(12) United States Patent
Hanus et al.

(10) Patent No.: US 7,297,893 B2
(45) Date of Patent: Nov. 20, 2007

(54) PLASMA ARC COLLIMATOR DESIGN AND CONSTRUCTION

(75) Inventors: Gary J. Hanus, Edina, MN (US); David P. Bergsrud, Hugo, MN (US); Steven D. Hickel, New Hope, MN (US)

(73) Assignee: Phoenix Solutions Co., Minneapolis, MN (US)

( * ) Notice: Subject to any disclaimer, the term of this patent is extended or adjusted under 35 U.S.C. 154(b) by 0 days.

(21) Appl. No.: 11/732,430

(22) Filed: Apr. 3, 2007

(65) Prior Publication Data

US 2007/0175870 A1 Aug. 2, 2007

Related U.S. Application Data

(63) Continuation of application No. PCT/US2005/035927, filed on Oct. 6, 2005.

(60) Provisional application No. 60/616,797, filed on Oct. 7, 2004.

(51) Int. Cl.
*B23K 10/00* (2006.01)

(52) U.S. Cl. ............................ 219/121.5; 219/121.48; 219/75; 219/121.52; 313/231.31

(58) Field of Classification Search ............. 219/121.5, 219/121.48, 121.51, 121.52, 119, 74, 75, 219/121.36; 313/231.31, 231.41
See application file for complete search history.

(56) References Cited

U.S. PATENT DOCUMENTS

| | | | |
|---|---|---|---|
| 3,194,174 | A | 7/1965 | Coberly et al. |
| 3,818,174 | A | 6/1974 | Camacho |
| 4,559,439 | A | 12/1985 | Camacho et al. |
| 5,362,939 | A | 11/1994 | Hanus et al. |

*Primary Examiner*—Mark Paschall
(74) *Attorney, Agent, or Firm*—Nikolai & Mersereau, P.A.; Thomas J. Nikolai

(57) ABSTRACT

An improved collimator for a plasma arc torch consists of an annular holder member and an insert member. The insert member includes a tubular stem portion ending in an integrally formed, radially extending face plate. When the stem portion is fitted into the central bore of the holder member with a predetermined clearance fit therebetween, a cooling water passage is created. The improved collimator is characterized by the absence of any welds between the holder member and the insert member that would be exposed to conductive gases given off during use of the plasma arc torch and a lesser resistance to cooling water flow than prior art collimator designs.

8 Claims, 6 Drawing Sheets

PLASMA ARC COLLIMATOR DESIGN AND CONSTRUCTION

CROSS-REFERENCE TO RELATED APPLICATION

This application is a continuation of prior PCT Application PCT/US2005/035927, filed 06 Oct. 2005.

This application claims priority to provisional application Ser. No. 60/616,797, filed Oct. 7, 2004, the contents of which are hereby incorporated by reference.

BACKGROUND OF THE INVENTION

1. Field of the Invention

This invention relates generally to plasma arc torches, and more particularly to the design and construction of an improved collimator component of such plasma arc torches.

2. Discussion of the Prior Art

Plasma arc torches are known in the prior art and comprise a device which can efficiently convert electrical energy into heat energy. Plasma arc torches, as the name implies, generate a plasma plume exhibiting a high specific enthalpy coupled with low gas requirements. As is set out in the Camacho et al. U.S. Pat. No. 4,559,439, there are basically two types of plasma arc torches. The first type is referred to as a non-transferred arc torch and the second is referred to as transferred arc torches. In the non-transferred arc type, there is a rear electrode, a front electrode-and a gas vortex generator that is coaxially placed between the front and rear electrodes. This assembly is contained within a water-cooled housing along with other components necessary for generating an electrical arc. The arc extends from the rear electrode past the gas vortex generator location and to an attachment point on the front electrode.

In the transferred-arc type of plasma generator, a collimating nozzle is mounted in coaxial alignment with the rear electrode and vortex generator. In this type of operation, the electrical arc attaches between the rear electrode and an external work piece that is being worked upon after passing through the collimating nozzle.

Transferred arc generators are described in U.S. Pat. No. 3,194,941 to Baird, and in U.S. Pat. No. 3,818,174 to Camacho. The present invention is directed to an improved collimator for a transferred arc-type plasma arc torch and is deemed to be an improvement over the prior art, such as the collimator shown in FIGS. 1-3 of the accompanying drawings.

Referring to FIG. 1, there is shown a conventional, prior art plasma torch of the transferred arc-type. It is indicated generally by numeral 10 and includes an outer steel shroud 12 having a proximal end 14 and a distal end 16. The shroud surrounds various internal components of the torch, including a rear electrode 18, a gas vortex generator 20 and other tubular structures that create a cooling water passage leading to a collimator member 22 that is threadedly attached into the distal end 16 of the shroud 12 and a passage for returning the heated cooling water to an outlet port. Tubing (not shown) connects to a water inlet stub 24 and after traversing the water passages in the torch body and the collimator, the heated water exits the torch at a port 26. Details of the water circulation path for a plasma arc torch are more clearly set out and explained in the Hanus et al. U.S. Pat. No. 5,362,939 and, hence, need not be repeated here. The gas for the plasma arc torch is applied under pressure to an inlet port 28 and it passes through annular channel isolated from the incoming and outgoing water channels, ultimately reaching the gas vortex generator 20. A high positive voltage is also applied to the water inlet stub 24 and the negative terminal of the power supply connects to the work piece 30.

The gas injected into port 28 becomes ionized and is rendered plasma by the arc 32 and is injected onto the work piece 30. The collimator 22 includes a longitudinal bore having a frusto-conical taper 34 and serves to concentrate the plasma into a beam, focusing intense heat that speeds up melting of and chemical reaction to the work piece in a furnace in which the plasma torch is installed.

Keeping in mind that the exposed toroidal face 36 of the collimator 22 is exposed to corrosive chemicals given off from the melting/gasification of the work material 30 as well as to secondary arcs, especially in the tapered zone 34 of the collimator, it is imperative that the collimator not be allowed to deteriorate to the point where cooling water can escape the normal channels provided in the torch and flow out onto the work piece that may typically be at a temperature of 2000° F. or more. Resulting superheated steam could create an explosive force within the confines of the plasma arc heated furnace. To avoid such an event, it becomes necessary to shut down the process and replace the collimator at relatively frequent intervals.

Referring to FIG. 2, there is shown a perspective view from the side of the prior art collimator 22 of FIG. 1. It is seen to comprise a holder member 38 having a generally cylindrical outer wall that is machined along a top edge portion with a flat surface, as at 40, forming a hexagonal pattern that allows the holder member to be grasped by jaws of a wrench and screwed into the threaded distal end of the torch shroud 12. The threads on the holder member are identified by numeral 42 in FIG. 2. The holder member 38 is preferably machined out from a generally cylindrical copper alloy billet, the particular copper alloy being a good electrical and thermal conductor.

Located directly below the threaded zone 42 on the holder member is a plurality of bores, as at 44, the bores being regularly spaced circumferentially about the periphery of the holder member. An integrally formed annular collar 46 is provided at the proximal end of the collimator.

FIG. 3 is a longitudinal, cross-sectional view taken through the center of the prior art collimator assembly. Here it can be seen that the holder member 38 has a central longitudinal bore 48 and a counterbore 50 that is formed inwardly from a face surface 52 of the holder member. Further, it can be seen that the radial bores 44 are in fluid communication with the central bore 48.

The prior art collimator 22 further includes a tubular insert 54 machined from a copper alloy billet. It has a central lumen 56 and an outer wall 58 whose diameter is dimensioned to fit within the central bore 48 of the holder member with a predetermined clearance space between the wall defining the central bore of the holder member and the outer diameter of the tubular insert. The insert is also formed with a circular plate-like flange 60 at its distal end that surrounds the lumen 56. Further, the cross-sectional view of FIG. 3 shows that the lumen 56 has a frusto-conical tapered portion 62 leading to a face surface 64 of the flange 60.

In the prior art collimator assembly shown in FIG. 3, with the tubular insert 54 disposed within the bore 48 of the holder member and with the flange 60 inserted into the counterbore 50, the joint between the periphery of the flange 60 and the wall of the counterbore 50 is suitably welded, preferably e-beam welded. Likewise, the joint between the collar 46 of the holder member and a portion of the exterior wall of the tubular insert are designed to fit together with a close tolerance and this joint is also e-beam welded.

As is explained in the Hanus, et al. '939 patent, supra, cooling water is made to flow through a first annular passageway in the torch housing, through the radial bores 44 of the collimator and through the clearance space between the bore 48 and the outer tubular wall 58 of the insert 54 and from there through radial bores 66 and out through an annular port to another passageway contained within the housing 12 and leading to the water outlet port 26 seen in FIG. 1.

The weld made at the joint between the counterbore 50 and the periphery of the flange 60 have proven to be problematic. Extensive corrosive action from the furnace gases corrodes the material on either side of this weld ring and of the e-beam weld itself The life of the collimator is thereby limited by either the integrity and precision of the e-beam weld itself or by the loss of material due to corrosion. This corrosive loss of material may be a result of both galvanic and non-galvanic corrosion. The galvanic corrosion, of course, is due to the presence of dissimilar materials in contact within an electrically conductive medium, such as the gas given off by the reaction of the arc flame with the work piece. The non-galvanic, standard corrosion is due to chemical reaction between the corrosive gases given off by vaporization of the work piece within the plasma arc heated furnace.

As is apparent from FIG. 3, failure of the e-beam weld, whether due to formation of a poor weld or because of corrosion, can lead to significant leakage of cooling water through the failed joint. To avoid this potentially harmful condition, the collimator component of the plasma arc torch must be replaced at frequent intervals before significant corrosion can occur, forcing a shut-down of the reactor furnace and attendant loss of production.

A need, therefore, exists for a collimator design having an increased working life and safety improvements over the prior art. The present invention satisfies this need.

SUMMARY OF THE INVENTION

In accordance with the present invention the improved collimator comprises an annular holder member formed from an electrically conductive alloy that has an outer diameter with threads over a predetermined surface thereof. The threads are adapted formating with the threads on the inner surface on a plasma arc torch housing. The holder member has a central bore of a predetermined diameter extending from a first end to a second end thereof. The collimator further includes an insert member adapted to fit within the central bore of the holder member. It, too, is formed from an electrically conductive alloy. The insert member has a tubular stem portion concentrically disposed and integrally formed with a generally circular, radially extending faceplate. The tubular stem portion has an outer diameter that is less than the predetermined diameter of the central bore in the holder member. Hence, insertion of the tubular stem portion of the insert member into the central bore of the holder member defines an annular cooling water passage there between. The faceplate of the insert member has an annular, proximally-extending flange that engages the outer diameter of the holder member at locations offset and remote from a front surface of the faceplate. Rather than having an e-beam weld ring on the exposed face of the collimator as in the prior art depicted by FIG. 3, in the present invention the rearwardly extending flange on the faceplate of the insert is welded to the holder member at locations that are offset from the exposed front surface of the faceplate. More particularly, the welds are at discrete locations that are disposed within the outer housing of the plasma torch when the collimator assembly is screwed into the plasma torch housing.

DESCRIPTION OF THE DRAWINGS

The foregoing features, objects and advantages of the invention will become apparent to those skilled in the art from the following detailed description of a preferred embodiment, especially when considered in conjunction with the accompanying drawings in which.

DESCRIPTION OF THE PREFERRED EMBODIMENT

Figure 1:
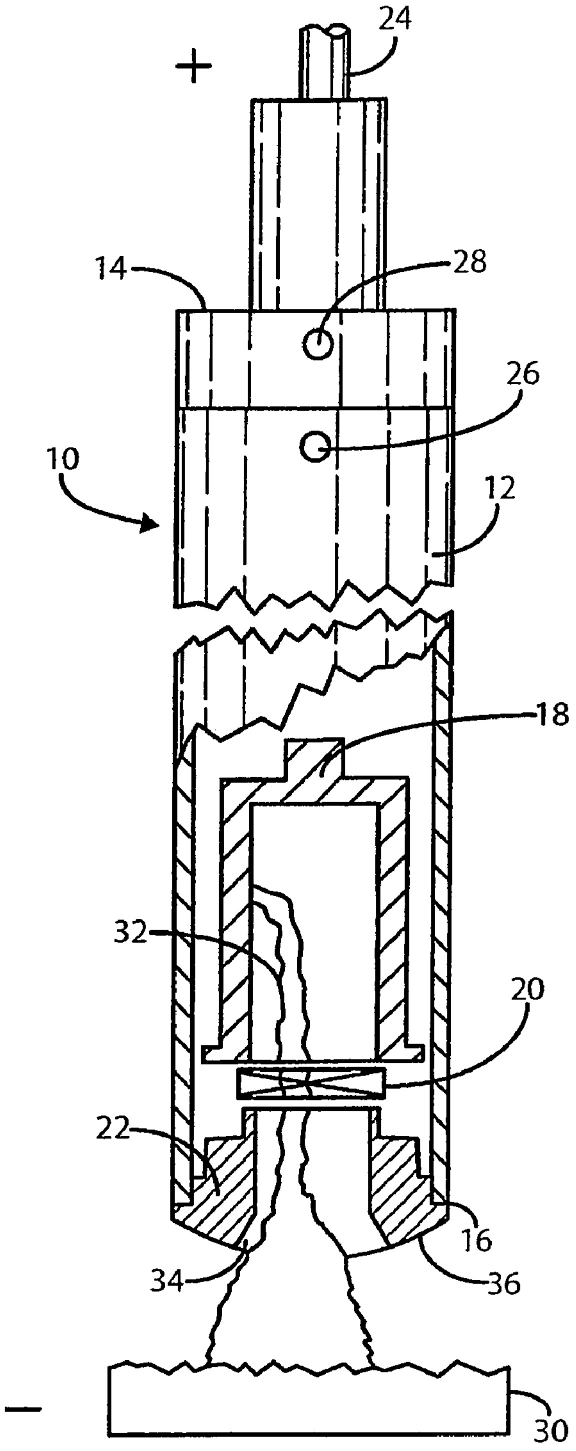
FIG. 1 (PRIOR ART)
FIG. 1 is a partially sectioned view of a transfer arc plasma torch showing a collimator at the distal end thereof.

Certain terminology will be used in the following description for convenience in reference only and will not be limiting. The words "upwardly", "downwardly", "rightwardly" and "leftwardly" will refer to directions in the drawings to which reference is made. The words "inwardly" and "outwardly" will refer to directions toward and away from, respectively, the geometric center of the device and associated parts thereof. Said terminology will include the words above specifically mentioned, derivatives thereof and words of similar import.

Figure 4:
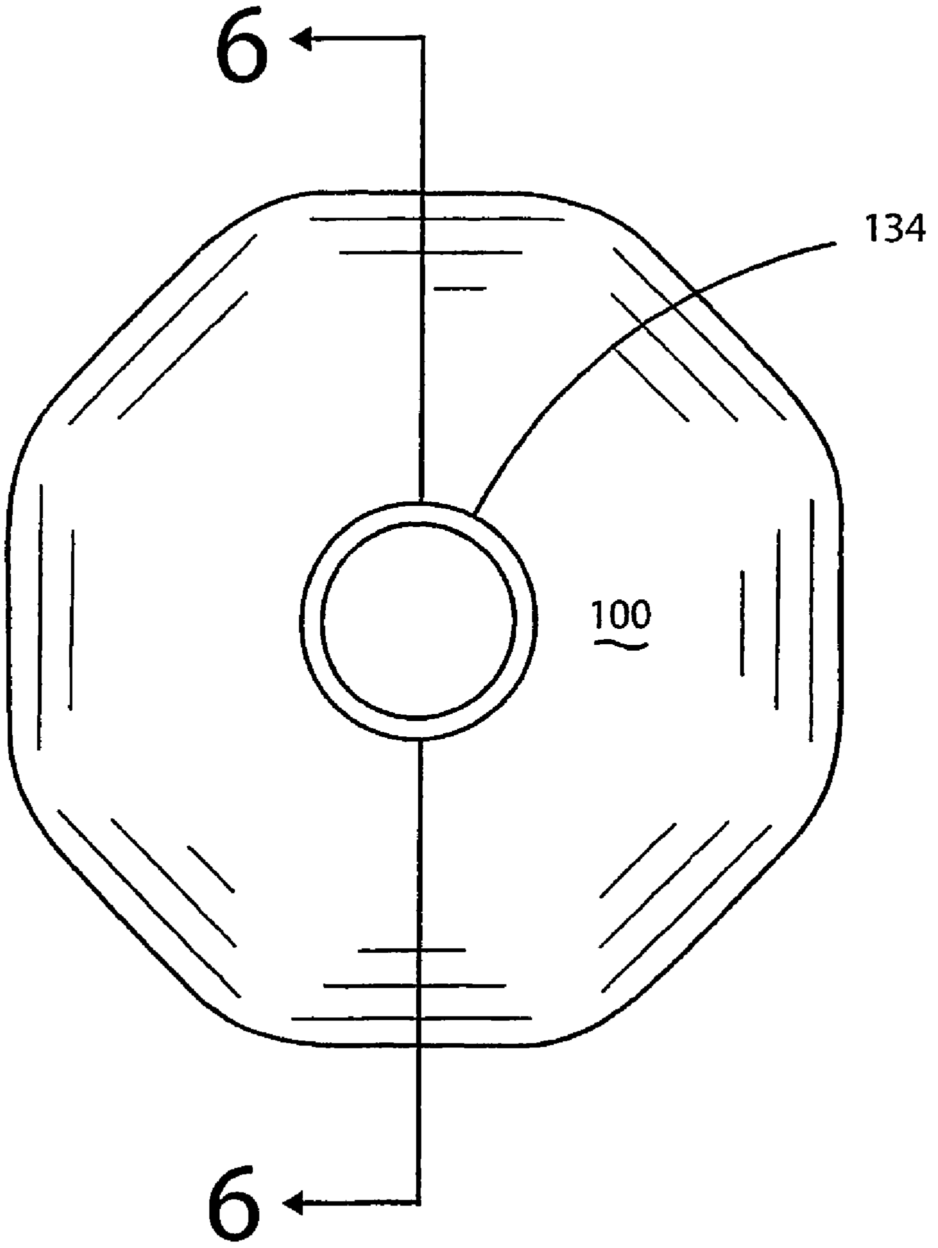
FIG. 4 is a distal end view of the collimator constructed in accordance with the present invention and illustrating a one-piece face plate.
Figure 5:
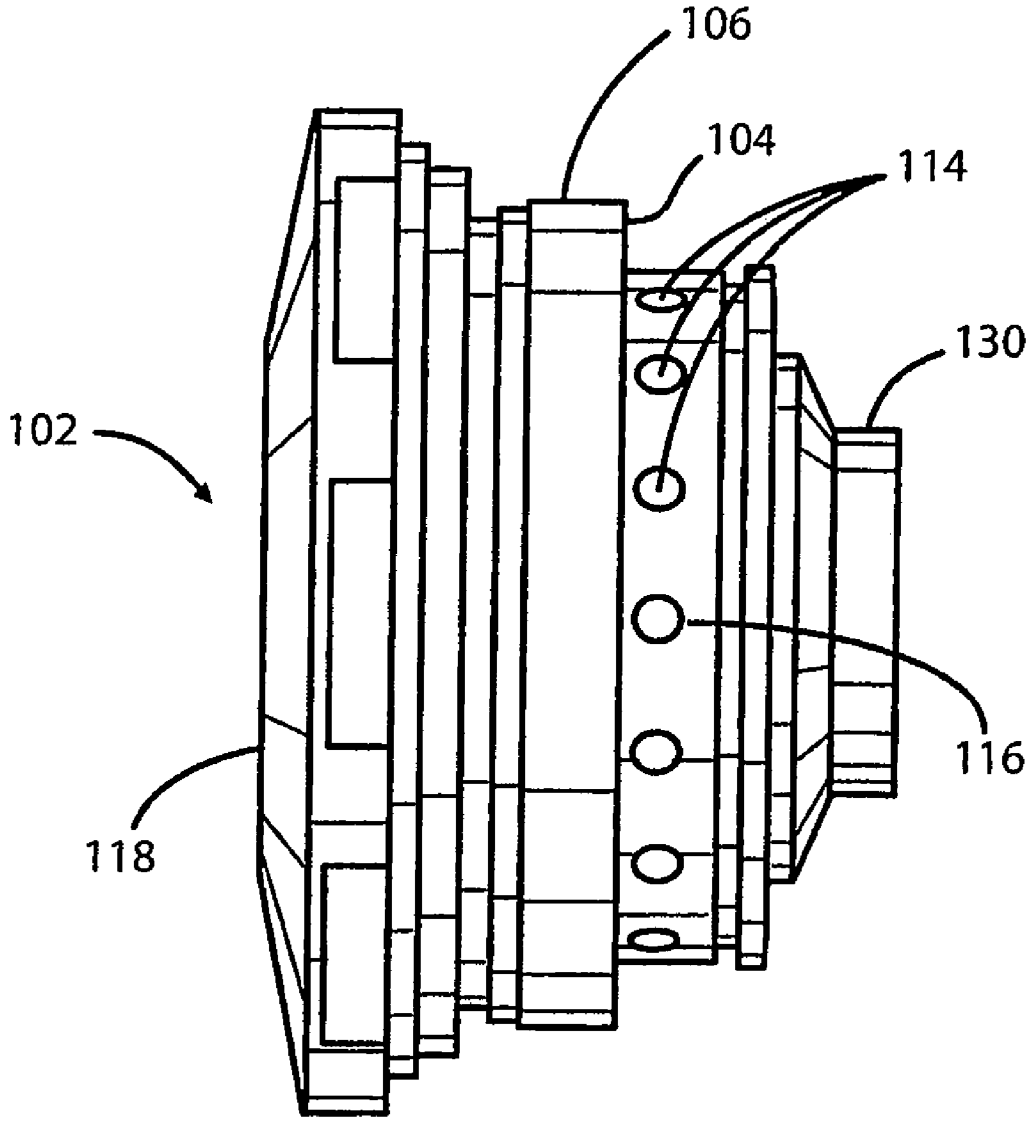
FIG. 5 is a side elevation view of the collimator of the present invention.

Referring first to FIG. 4, there is shown a distal end view of the improved collimator component constructed in accordance the present invention. It is immediately apparent from this view that the exposed face 100 of the collimator does not exhibit a weld ring as in the prior art design described earlier. As such, the exposed face surface 100 of the collimator is less subject to failure due to inferior welding techniques and/or galvanic or non-galvanic corrosion. The manner in which this is accomplished is best seen in the cross-sectional view of FIG. 6. It is a longitudinal cross-section taken along the line 6-6 in FIG. 4. The improved collimator assembly is indicated generally by numeral 102 (FIG. 5) and is seen to comprise an annular holder member 104 formed from an electrically conductive alloy, preferably a copper alloy, and having an outer diameter 106 that is provided with threads on a predetermined surface thereof. The threads are adapted to mate with threads on the inner surface of the housing 12 for the plasma arc torch. The holder member 104 has a central bore 108 generally of a predetermined diameter that extends from a first end 110 to a second end 112 thereof. The annular holder member 104 further includes a plurality of obliquely extending, circumferentially-spaced, radial bores 114 formed therethrough leading from the inside diameter to a somewhat reduced outside diameter 116 (outside diameter 116 less than the outside diameter 106).

Fitted into the central bore 108 of the holder member 104 is an insert member 118. The insert member is also preferably formed from an electrically conductive alloy, e.g., a copper alloy. The insert member has a tubular, longitudinally extending stem portion 120 that is concentrically disposed and integrally formed with a generally circular radially extending faceplate 122 at one end of the stem portion.

As with the prior art, the tubular stem portion has an outer diameter that is less than the predetermined diameter of the central bore 108 of the holder member 104. Hence, when the tubular stem portion 120 of the insert member 118 is placed within the central bore of the holder member, an annular gap 124 is created that leads from the obliquely extending circumferentially-spaced, radial bores 114 to the front end 110 of the holder member 104.

Figure 6:
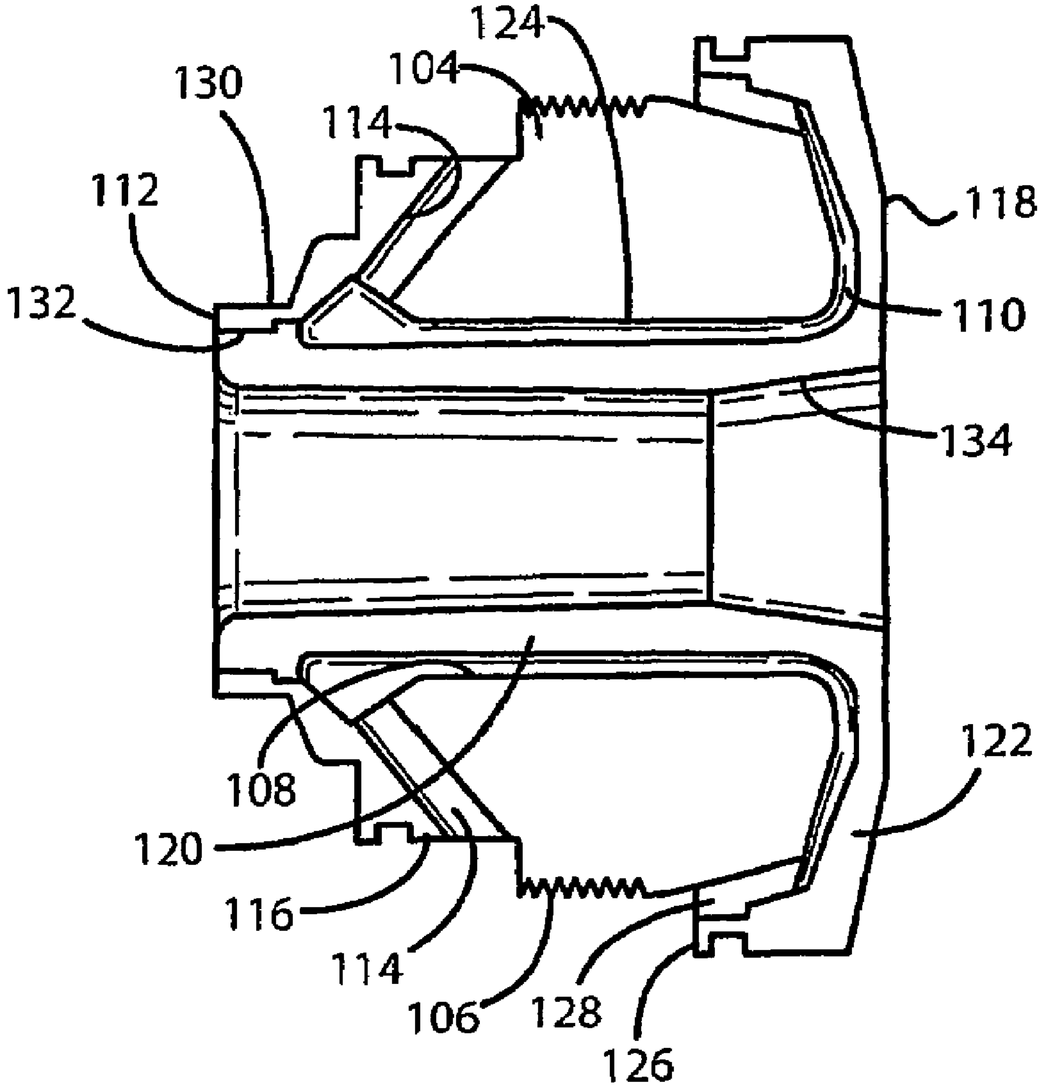
FIG. 6 is a cross-sectional view taken along the line 6-6 in FIG. 4.

With continued reference to FIG. 6, the faceplate 122 of the insert member 118 further includes an annular, rearwardly, i.e., proximally extending flange 126 that is dimensioned to engage an exposed outer surface of a series of radially spaced bosses 128 integrally formed on the periphery of the annular holder member 104. The bosses 128 are at locations offset proximally from the front surface 100 of the faceplate 122.

The insert member is joined to the annular holder member by forming a continuous e-beam weld between a collar 130 at the proximal end of the holder member 104 and a slightly raised annular collar 132 formed at the proximal end of the insert member 118. Further, the flange 126 is e-beam welded to the bosses 128 at locations that are offset from the front surface 100 of the faceplate 122 in a proximal direction.

When the collimator 102 of the present invention is screwed onto the distal end of the torch housing 12 (FIG. 1), cooling water introduced through the inlet port 24 will flow through an annular passageway in the housing 12 and thence through the obliquely extending radial ports 114 into the cooling water passageway 124 in the collimator assembly 102 and then out through spaces between adjacent bosses 128 and then returns through a second annular passageway in the housing 12 to the water outlet port 26. The distal end 16 of the plasma arc torch housing 12 is designed to overlay the flange 126 when the collimator assembly is screwed in place on the distal end of the torch housing and, thus, the weld between the bosses 128 and the flange 126 are shielded from exposure to conductive gases, thereby alleviating corrosion problems due to the dissimilar metals involved.

Figure 2:
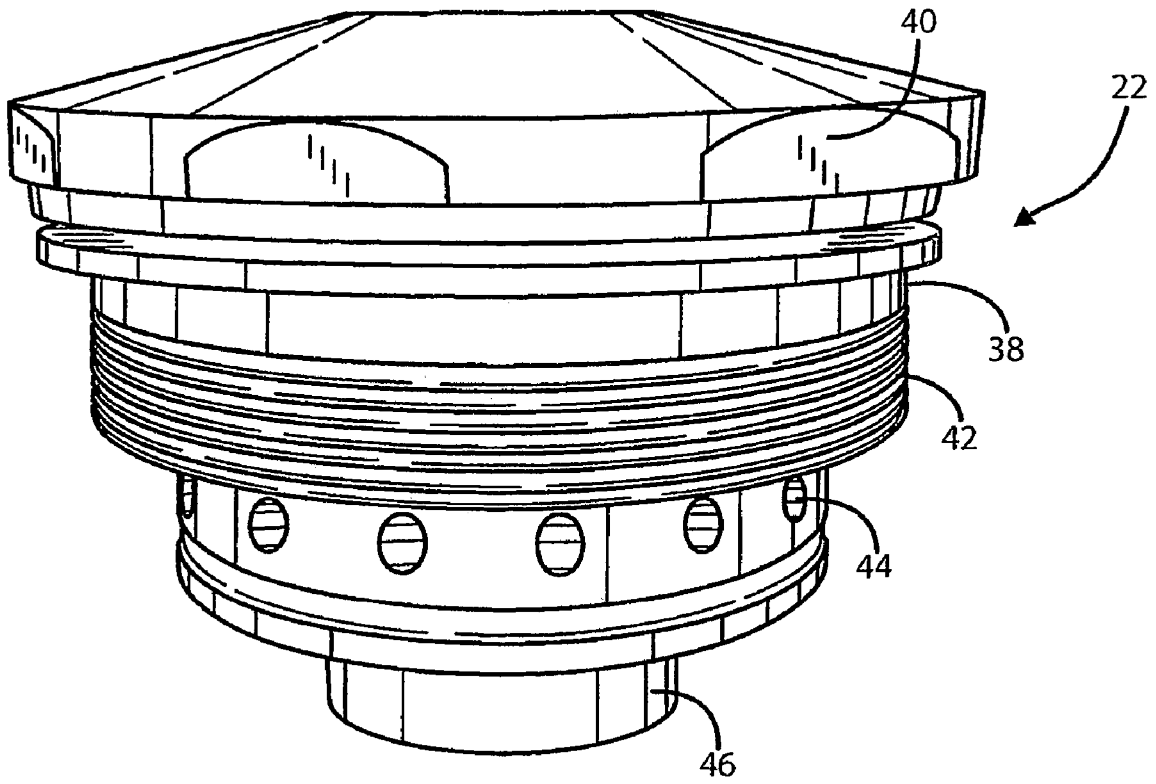
FIG. 2 (PRIOR ART)
FIG. 2 is a perspective view of the collimator removed from the plasma torch.
Figure 3:
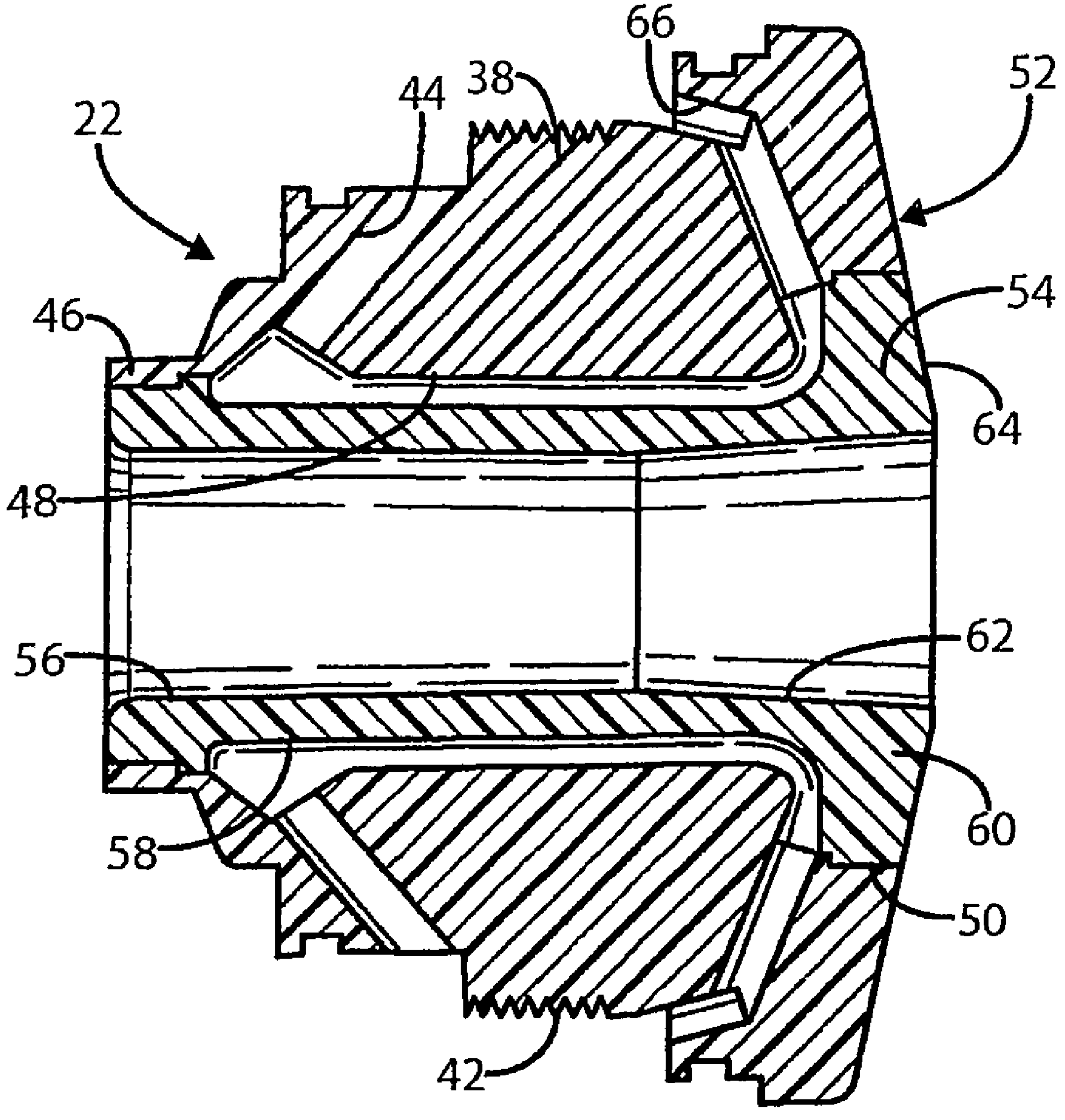
FIG. 3 ( PRIOR ART )
FIG. 3 is a cross-sectional view of the prior art plasma torch collimator of FIG. 1.

The improved collimator of the present invention also provides a continuous, smooth, annular cooling water flow passage from deep inside the collimator bore to a transition near the taper at 134, and the radially outward from the taper along the obverse side of the faceplate 122. In the prior art collimator of FIGS. 1-3, the cooling passage interrupts the annular water flow just after the turn from the taper exit near the e-beam weld ring area and transitions the flow to a discrete set of radially drilled holes. This interruption of the water flow development at or near the critical heat load and e-beam weld interface in the prior art design has been determined to be detrimental to maintaining low collimator material surface temperature necessary for minimizing corrosive chemical attack. The collimator design of the present invention, with its thinner faceplate and an increase in water velocity through the annular passage 124, allow it to operate at lower wall temperatures at the maximum heat load location near the exit of the taper.

By way of summary, the collimator constructed in accordance with the present invention offers several important improvements in terms of collimator life and overall safety. The present invention is of a simpler construction than the prior art and offers the opportunity for the high heat duty sections of the collimator, i.e., the face plate, to be fabricated from a single material with no welded seams exposed. Also, the collimator of the present invention offers a simpler and more effective cooling water passage to be implemented, thus providing the opportunity of achieving lower collimator material temperature. The single material construction of the exposed face avoids any possible galvanic corrosion contribution to the overall corrosion to which the collimator is exposed to in use and may reduce the overall corrosion due to the wall temperature sensitivity to chemical corrosion reaction rates. The combination of minimal galvanic activity and lower wall temperatures in critical, high heat load locations provides additional life to the collimator. Finally, and of significant importance, is the fact that the collimator design of the present invention provides a greater margin of safety, compared to the prior art design as it relates to the e-beam welding-related water leakage from the collimator.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

What is claimed is:

1. A collimator for a plasma arc torch, comprising:

(a) an annular holder member formed from an electrically conductive alloy and having an outer diameter with threads over a predetermined surface thereof adapted for mating with threads on an inner surface of a plasma arc torch housing, the holder member having a central bore of a predetermined diameter extending from a first end to a second end thereof;

(b) an insert member formed from an electrically conductive alloy adapted to fit within the central bore of the holder member, the insert member having a longitudinally extending tubular stem portion concentrically disposed and integral with a generally circular, radially extending face-plate, the tubular stem portion having an outer diameter less than the predetermined diameter of the central bore in the holder member, whereby insertion of the tubular stem portion into the central bore of the holder member defines an annular cooling water passage therebetween; and (c) the face-plate of the insert member including an annular, rearwardly-extending flange that engages the outer diameter of the holder member at locations offset from a front surface of the face-plate whereby a joint between said flange and said holder member is contained within the housing when the holder member threads mate with the threads of the housing.

2. The collimator as in claim 1 wherein the annular holder member further includes a plurality of obliquely extending, circumferentially-spaced, radial bores formed therethrough and in fluid communication with the annular cooling water passage.

3. The collimator as in claim 2 wherein the cooling water passage extends along a majority of a length dimension of the tubular stem portion of the insert member and over an inner surface of the face-plate.

4. The collimator as in claim 1 wherein the electrically conductive alloy is a copper alloy.

5. The collimator as in claim 2 wherein the tubular stem portion of the insert member is circumferentially welded to the holder member at a location proximal of the obliquely extending, circumferentially-spaced, radial bores.

6. The collimator as in claim 5 wherein the flange is welded to the holder member at said locations offset from the front surface of the face-plate.

7. The collimator as in claim 6 wherein the locations where the flange is welded to the holder member are disposed within the plasma torch housing when the threads on the outer diameter of the holder member are mated with threads on an inner surface of the plasma torch housing.

8. The collimator as in claim 1 wherein a lumen of the tubular stem portion includes a conically tapered portion proximate a distal end thereof.

* * * * *